Figure 1:
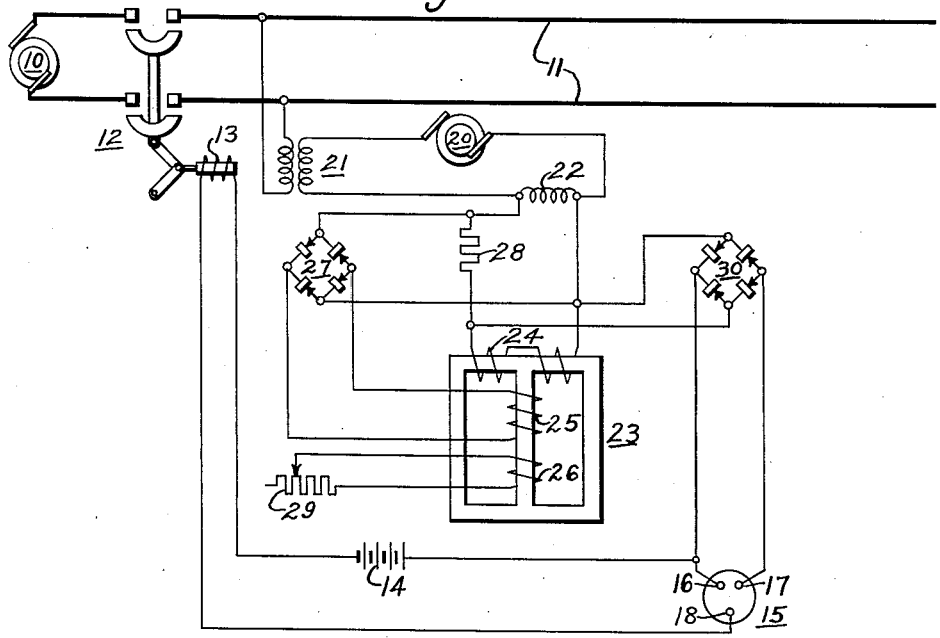

June 4, 1929.  P. THOMAS  1,715,684

PROTECTIVE SYSTEM

Filed May 3, 1928

INVENTOR
Phillips Thomas

BY
*Chesley L. Carr*
ATTORNEY

Patented June 4, 1929.

1,715,684

UNITED STATES PATENT OFFICE.

PHILLIPS THOMAS, OF EDGEWOOD, PENNSYLVANIA, ASSIGNOR TO WESTINGHOUSE ELECTRIC & MANUFACTURING COMPANY, A CORPORATION OF PENNSYLVANIA.

PROTECTIVE SYSTEM.

Application filed May 3, 1928. Serial No. 274,761.

This invention pertains to protective systems for alternating-current distribution circuits and, more particularly, to a protective system which shall be capable of discriminating between short-circuits and load increments even though the latter be of higher absolute value than the former.

A further object of my invention is to provide a system of the type described which shall be effective promptly to isolate a portion of a distribution circuit wherein a fault exists but which shall be unaffected, ordinarily, by load increments even though the latter are larger than short-circuit currents.

A further object of my invention is to provide a protective system of the class described which shall operate to disconnect a distribution circuit from a source of supply upon the occurrence of a short-circuit, but not on a legitimate over-load unless the absolute value of the latter exceeds a predetermined value.

In accordance with my invention, a series transformer or reactor connected in the distribution circuit furnishes a control voltage proportional to the rate of growth of current in the circuit, and the value which this control voltage attains determines whether a circuit-interrupter in the distribution circuit shall be tripped open or not. By utilizing a control voltage which is proportional to the rate of change of current in the distribution circuit, it is possible to distinguish between short-circuits and normal over-loads even though the latter are of greater absolute value than the former.

This distinction is made possible by the difference in the characteristics of the two types of conditions to be distinguished. The increase in the current in the load circuit upon the occurrence of a short-circuit is of a sharply rising characteristic, since the rate of change is limited only by the inductance of the distribution system and the final value only by the impedance of the short-circuit. A load increment, however, rises at a much slower rate than a short-circuit because of the considerable impedance of the load devices which cause the increased load current. It is thus obvious that, by providing a control system which depends for its operation upon the rate of change of current in a distribution circuit, I am able to distinguish between short-circuits and normal over-load conditions.

Another feature of my invention is the use of a saturable iron-core reactor having an alternating-current and a direct-current winding. This device is described in my co-pending application Serial No. 221,490 filed September 23, 1927 for synchronizing relay system, and depends for its operation upon the principle that the superposition of a uni-directional flux upon an alternating flux in a magnetic circuit tends to decrease the net alternating flux, the effective reactance of the winding inducing the alternating flux, and also the voltage across said winding.

Further objects of my invention will become apparent as the description thereof proceeds, and the features which I consider novel will be pointed out in the appended claims.

Figure 2:
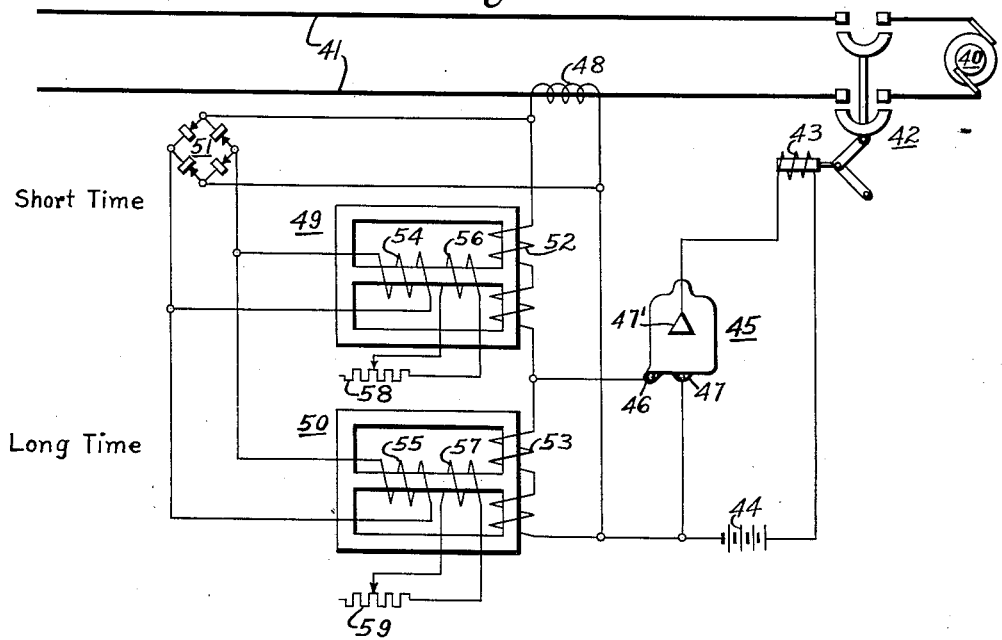

My invention may best be understood by reference to the accompanying drawings, in which Figures 1 and 2 illustrate diagrammatically, modifications of my invention.

Referring to Fig. 1, a generator 10 is adapted to supply energy to a distribution circuit 11 through a circuit-interrupter 12. The circuit-interrupter 12 is provided with a trip coil 13 which is connected in circuit with a source of energy such as a battery 14 and a relay 15.

The relay 15 may be a device of any desired type, electromagnetic or otherwise, but I have illustrated an electron discharge device as an example. This device consists of a plurality of electrodes 16, 17 and 18 within a container which encloses a small quantity of one of the rare gases such as argon, at a low pressure. This relay 15 is designed so that, when a discharge is initiated between the electrodes 16 and 17, a further discharge will occur between the electrodes 16 and 18, and the relay may be designed so that the first mentioned discharge will be initiated at any predetermined value of voltage.

It has already been suggested to employ a superposed high-frequency control current for protective systems such as that constituting my invention. While the use of a superposed high-frequency is, per se, no part of my invention, I have illustrated my protective system in connection with such system as an example of one application which may be made thereof.

Preferably, the high-frequency protective system comprises a high-frequency generator 20 and a transformer 21 for impressing the high-frequency control voltage upon the distribution circuit 11. In series with the primary winding of the transformer 21 and the generator 20, I propose to connect a series reactor 22. The voltage drop in the reactor 22 obviously will be proportional to the current supplied by the generator 20 to the distribution circuit, and, upon an increase in the value of this current, the voltage drop in the reactor will be correspondingly increased.

The high-frequency supply is so designed and connected that, upon the occurrence of a short-circuit or over-load upon the circuit 11, the current supplied thereto by the high-frequency generator 11 will increase in substantially the same proportion as the current supplied to the circuit by the generator 10.

It is to be noted that the system of my invention is equally applicable to distribution systems in which a high-frequency control voltage is not employed. In such instance, the series reactor 22 may be connected directly in the distribution circuit 11 instead of in the high-frequency circuit connected thereto. This modification of my invention will be described in connection with Fig. 2. The chief advantage to be derived from the use of a high-frequency control voltage is that more rapid opening of the circuit-interrupter is possible than when the commercial frequency of the system is depended upon to initiate the tripping operation. This results, of course, from the fact that the high-frequency current reaches a maximum value after short-circuit in a much shorter time than the ordinary commercial frequency.

In addition to the series reactor 22, the protective system of my invention includes also a saturable iron-core reactor 23. This reactor is provided with an alternating-current winding 24 and a direct-current winding 25. The winding 25 is energized by a rectifier 27 connected across the reactor 22. The reactor 23 is also provided with a short-circuited winding 26, the function of which is to oppose changes in the magnetization of the center arm of the reactor. A resistor 28 is connected in series with the winding 24 and the winding 26 is connected to a variable resistor 29.

A second rectifier 30 is connected across the winding 24 and its direct-current terminals are connected to the electrodes 16 and 17 of the electron discharge device 15.

The operation of the protective system of my invention will now be described.

Assuming that a short-circuit exists upon the distribution system 11, the current supplied thereto by the generator 10 and the generator 20 will increase at a rapid rate. The increase in the current supplied to the fault by the generator will cause a corresponding increase in the voltage across the series reactor 22. Thus an increased voltage is impressed upon the winding 24 of the reactor 23 and, at the same time, upon the rectifier 27.

The winding 24 is equally distributed upon the two halves of the magnetic circuit of the reactor 23 in such a manner that normally the net alternating flux in the center arm of the reactor is zero. The rectifier 27, being energized by the voltage across the reactor 22, tends to supply current to the winding 25 on the center arm of the reactor 23. The growth of current in the winding 25, however, is opposed by the effect of the winding 26, the circuit of which is closed upon itself through the resistor 29.

Thus the winding 25 is ineffective to cause the voltage across the winding 24 to be reduced, in accordance with the foregoing explanation, until the lapse of a predetermined time delay depending upon the setting of a rheostat 29.

The voltage across the winding 24 of the reactor 23 is impressed upon the rectifier 30 which, in turn, impresses a proportional voltage upon the electrodes 16 and 17 of the relay 15.

It is obvious that the various elements of the system already described may be so designed that, upon the occurrence of a short-circuit, the voltage upon the winding 24 of the reactor 23 will be sufficient to initiate an electronic discharge between the electrodes 16 and 17 of the relay 15. As already stated, this results in a discharge between the electrodes 16 and 18 which is of considerably greater magnitude than that between the electrodes 16 and 17, so that the trip coil 13 of the circuit-interrupter 12 is energized sufficiently to open the interrupter 12.

Assuming now that an over-load of slowly rising characteristic exists upon the circuit 11, it is obvious that the current supplied thereto by the generators 10 and 20 will increase at a relatively low rate. The voltage appearing across the series reactor 22 is, of course, proportional to the rate of change of current supplied by the generator 20.

The slowly increasing voltage across the reactor 22 is effective to energize the rectifier 27 and the winding 24 of the reactor 23. Since the increase in the voltage upon the winding 24 and the rectifier 27 is of a slowly rising characteristic, the energization of the winding 25 by the rectifier 27 will be substantially proportional to the energization of the winding 24. This operation results because the resistor 29 is so adjusted that the time delay introduced by the winding 26 is not sufficient to prevent the winding 25 from becoming effective to reduce the voltage induced in the winding 24, when the voltage impressed thereon increases at a low rate.

It thus appears that the voltage across the winding 24, in case of a slowly rising increase in the current supplied by the generator 20 to the circuit 11, is insufficient to cause the operation of the relay 15, because the winding 25 becomes effective to prevent the voltage across the winding 24 from attaining a value sufficient to operate the relay 15, before the voltage across the winding 24 increases to the operative voltage of the relay 15.

It may become desirable, in protective systems of the type described, to trip a circuit-breaker if a slowly increasing load current attains a final value in excess of a predetermined figure. I have provided for such an arrangement in the modification of my invention as shown in Fig. 2.

In Fig. 2 a generator 40 is adapted to supply energy to a distribution circuit 41 through a circuit interrupter 42. The interrupter 42 is provided with a trip coil 43 connected in series with a battery 44, or other source of energy, and an electron discharge device 45 similar to that shown at 15 in Fig. 1. As already stated the electron discharge device 45 may be replaced by a relay of any desired type. The device 45 differs from the relay 15 in that its electrodes 46 and 47 are mercury pools instead of solid electrodes. The relay 45 has a third electrode 47'.

A current transformer 48 in the circuit 41 energizes the protective system of my invention, which consists of saturable reactors 49 and 50 and a rectifier 51. The reactors 49 and 50 have alternating-current windings 52 and 53, direct-current windings 54 and 55 and short-circuited winding 56 and 57.

The alternating-current windings 52 and 53 are connected in series to the transformer 48. It is to be noted here that the series reactor such as that illustrated at 22 may replace the transformer 48 in the system of Fig. 2 and that, if desired, the superposed high-frequency control voltage may be utilized in the system of Fig. 2 as already explained in connection with Fig. 1. The rectifier 51 is connected across the transformer 48 and supplies direct current to the windings 54 and 55 connected thereto in parallel.

The electrodes 46 and 47 of the electron discharge device 45 are connected to the terminals of the alternating-current winding 53 of the reactor 50.

The operation of the system shown in Fig. 2 to detect the existence of a short-circuit upon the circuit 41 is similar to that of the system of Fig. 1. When the current traversing the circuit 41 increases at a rapid rate, as a result of a short-circuit, for example, the voltage across the transformer 48 increases correspondingly. The rectifier 51 is energized by this voltage and tends to send current through the windings 54 and 55 of the reactors 52 and 53. This tendency is opposed by the short-circuited windings 56 and 57 as already explained. Thus the windings 54 and 55 are ineffective, for a short time, to reduce the voltage across the windings 52 and 53, and the voltage across the winding 53 is effective to initiate a discharge between the electrodes 46 and 47 of the relay 45. When this discharge has been initiated, a discharge also takes place between the electrodes 47 and 47' and the trip coil 43 is energized to open the interrupter 42.

When an over-load having slowly rising characteristics occurs on the circuit 41, the windings 54 and 55, because of the setting of the rsistors 58 and 59 to which the windings 56 and 57 are connected, are effective to prevent the voltage across the windings 52 and 53 from attaining a voltage sufficient to operate the relay 45. The settings of the resistors 58 and 59 are such that the time delay between the energization of the winding 54 and the resulting reduction in the voltage across the winding 52 is relatively short compared to the delay interposed between the energization of the winding 55 and the resulting effect upon the voltage induced upon the winding 53. The voltage across the winding 52, therefore, reaches its final value more quickly than does the voltage across the winding 53.

When a slowly rising over-load attains a predetermined value it becomes desirable to open the interrupter 42 and the system shown in Fig. 2 accomplishes this result in the following manner. When the over-load has reached this predetermined value, the voltage across the transformer 48 has been greatly increased, and the rectifier 51 supplies sufficient current to the windings 54 and 55 to cause the voltage across the windings 52 and 53 to be reduced. The reduction in the voltage across the winding 52, because of the adjustment of the resistor 58, precedes the reduction of the voltage across the winding 53 of the reactor 50. Thus, when the voltage across the transformer 48 increases sufficiently, the voltage across the winding 53 will be sufficient to initiate a discharge between the electrodes 46 and 47 and the resulting discharge by the electrodes 47 and 47' will cause the tripping of the breaker 42.

It will be obvious that the systems of protection described above possess numerous advantages over those known to the prior art. One of the chief advantages of these systems is that they involve no moving parts except the circuit-breaker itself and, consequently, the chances for failure of the systems are greatly reduced.

Certain changes and alterations in the systems I have described will occur, no doubt, to those skilled in the art, and with regard to such changes, I desire to obtain the benefit thereof by the application of the doctrine of equivalents in construing the appended claims.

I claim as my invention:

1. In a protective system for a distribution circuit, a circuit-interrupter in said circuit, a protective circuit, means for inducing therein, a voltage proportional to the magnitude and rate of change of the current in said distribution circuit, means for decreasing said voltage and means for delaying the operation of said last-mentioned means for an adjustable time interval, and means responsive to the voltage in said protective circuit for controlling said interrupter.

2. In combination, a distribution circuit, a circuit-interrupter therein, a protective circuit, means for inducing therein a voltage dependent upon the magnitude and rate of change of the current in said distribution circuit, means for reducing the voltage applied to the protective circuit by said first-named means, means for delaying the operation of said voltage-reducing means for an adjustable time interval, and means responsive to the voltage in said protective circuit for controlling said interrupter.

3. In a protective system, the combination with a distribution circuit having a circuit-interrupter therein, of means for controlling said interrupter including a tripping circuit for said interrupter, means for impressing a voltage upon said tripping circuit, means for reducing the voltage impressed on said tripping circuit below the operating value thereof, and means for delaying the effect of said voltage-reducing means.

4. A protective system for a distribution circuit comprising an interrupter and a current transformer in said circuit, a reactor having an alternating-current winding connected to said transformer and a direct-current winding for varying the voltage induced in said alternating-current winding, means for energizing said direct-current winding from said transformer and means for delaying the effect of said direct-current winding upon said alternating-current winding, and means responsive to the voltage induced in said alternating-current winding for controlling said interrupter.

5. In a distribution circuit, the combination with an interrupter in said circuit, of protective means for controlling said interrupter including a series reactor in said circuit, a second reactor having an alternating-current winding and a direct-current winding connected to said series reactor, a rectifier connected between said series reactor and said direct-current winding, said second reactor having also a short-circuited winding, and a relay responsive to the voltage induced in said alternating-current winding.

6. A protective system for distribution circuits comprising a circuit-interrupter and a series reactor in the circuit to be protected, an iron-core reactor having an alternating-current winding connected to said series reactor, and a direct-current winding for varying the voltage induced in said alternating-current winding, said direct-current winding being connected to a rectifier energized by said series reactor, said iron-core reactor having also a short-circuited winding for delaying the effect of said direct-current winding to cause variations in the voltage induced in the alternating-current winding, and a relay responsive to the voltage induced in said alternating-current windings, for controlling said circuit-interrupter.

7. A protective system for a distribution circuit having a circuit-interrupter and a series reactor therein comprising two saturated-core reactors having alternating-current windings, direct-current windings and short-circuited windings, said alternating-current windings being connected in series across said series reactor, a rectifier also connected across said series reactor and to said direct-current windings, and a relay connected across the alternating-current winding of one of said saturated-core reactors, for controlling said circuit interrupter.

In testimony whereof, I have hereunto subscribed my name this 24th day of April, 1928.

PHILLIPS THOMAS.